(12) United States Patent
Lentz et al.

(10) Patent No.: US 12,104,907 B2
(45) Date of Patent: Oct. 1, 2024

(54) COMPACT STAR TRACKER USING OFF-AXIS PARABOLIC MIRROR

(71) Applicant: US Gov't as represented by Secretary of Air Force, Wright-Patterson AFB, OH (US)

(72) Inventors: Joshua Lentz, Niceville, FL (US); Kevin Brink, Fort Walton Beach, FL (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 881 days.

(21) Appl. No.: 17/192,978

(22) Filed: Mar. 5, 2021

(65) Prior Publication Data

US 2021/0318120 A1    Oct. 14, 2021

Related U.S. Application Data

(60) Provisional application No. 63/007,439, filed on Apr. 9, 2020.

(51) Int. Cl.
*G01B 11/26*    (2006.01)
*G01C 21/02*    (2006.01)
*G02B 5/10*    (2006.01)
*G02B 19/00*    (2006.01)

(52) U.S. Cl.
CPC .............. *G01C 21/025* (2013.01); *G02B 5/10* (2013.01); *G02B 19/0019* (2013.01); *G02B 19/0076* (2013.01)

(58) Field of Classification Search
CPC .... G01C 21/025; G02B 5/10; G02B 19/0019; G02B 19/0076
See application file for complete search history.

(56) References Cited

U.S. PATENT DOCUMENTS

| | | | |
|---|---|---|---|
| 3,021,524 A | * | 2/1962 | Kompfner ................ H01Q 3/08 D14/230 |
| 8,772,690 B2 | | 7/2014 | Smith et al. |
| 9,544,488 B2 | | 1/2017 | Dawson et al. |

FOREIGN PATENT DOCUMENTS

CN         109724588 A  * 12/2019  ............. G01C 21/02

OTHER PUBLICATIONS

McBryde et al., "A star tracker design for CubeSats." IEEE Aerospace Conference (2012) 14 pages total.
McBryde, C., & Lightsey, E.G. (2012). A star tracker design for CubeSats. 2012 IEEE Aerospace Conference, 1-14.

* cited by examiner

*Primary Examiner* — Mark Hellner
(74) *Attorney, Agent, or Firm* — AFMCLO/JAZ; John T. Addicks

(57) ABSTRACT

A compact celestial tracker includes a platform, a rotation stage that rotatably coupled to the platform to rotate a plane of the platform about a rotation axis and that supports the platform on a substrate, an off-axis parabolic mirror mounted to one side of the platform and having a focal plane directed at an acute angle that is between the rotation axis and the plane of the platform to reflect and focus the beam at a point above another side of the platform, and a detector coupled to the other side of the platform to receive and detect the reflected and focused beam.

1 Claim, 2 Drawing Sheets

COMPACT STAR TRACKER USING OFF-AXIS PARABOLIC MIRROR

CROSS-REFERENCE TO RELATED APPLICATIONS

This application claims the benefit of priority under 35 U.S.C. § 119 (e) to U.S. Provisional Application Ser. No. 63/007,439 entitled "Compact Star Tracker using Off-axis Parabolic Mirror," filed 9 Apr. 2020, the contents of which are incorporated herein by reference in their entirety.

ORIGIN OF THE INVENTION

The invention described herein was made by employees of the United States Government and may be manufactured and used by or for the Government of the United States of America for governmental purposes without the payment of any royalties thereon or therefore.

BACKGROUND

1. Technical Field

The present disclosure generally relates to optical sensors and more particularly to celestial tracking optical sensors.

2. Description of the Related Art

Traditional star trackers employ detectors fixed to refractive lenses or reflective telescopes which are then pointed around a field of regard (FOR) using a gimbal, flat mirror or Risley Prisms as the pointing mechanism. This approach leads to a hemispherical FOR that can be accessed by the steered field of view (FOV) of the optics, limited by the steering system (e.g., Risleys or gimbal). The size and weight requirements of the gimbaled system are quite high and the Risley approach introduces refractive errors that are difficult to correct for with an extended spectrum.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Star trackers can be used as stellar navigation aids on platforms (vehicles, telescopes, cameras, etc.) that are ground, air, sea or space-based, each with its own performance, size, weight and power restrictions. For example, a sea-based platform may be able to use a larger form factor and weight but has to contend with atmosphere. Space-based applications likely have more stringent limitations on both form factor and power consumption, but have no atmosphere to contend with. The star tracker invention presented herein directly addresses small form factor needs and is also valid for applications with more relaxed requirements.

Figure 1:
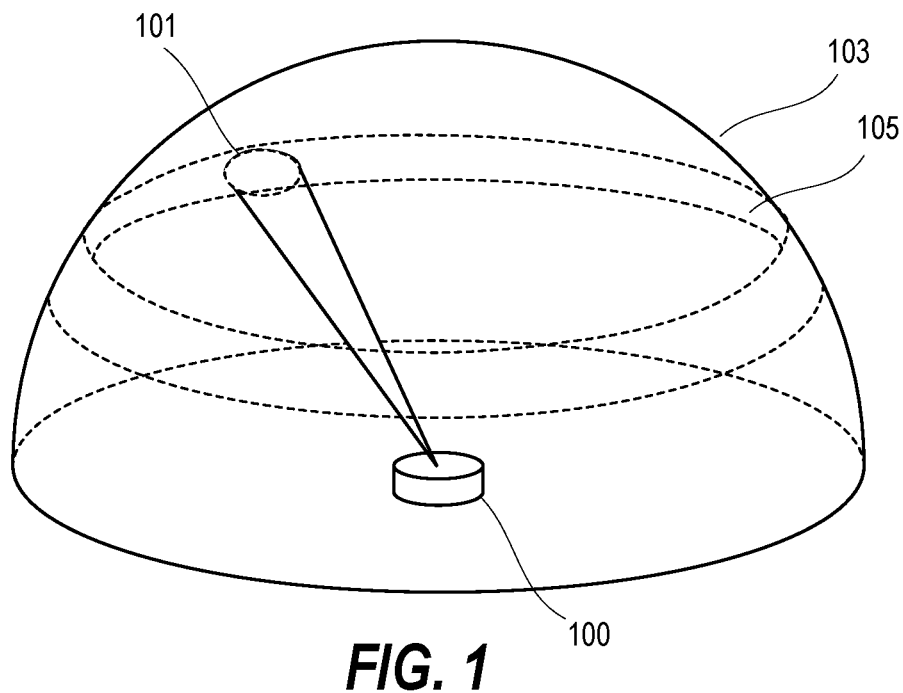
FIG. 1 is a three-dimensional view of a compact star tracker detecting an annular field of regard swept out by rotating a fixed hemispheric field of view, according to one or more embodiments.
Figure 2:
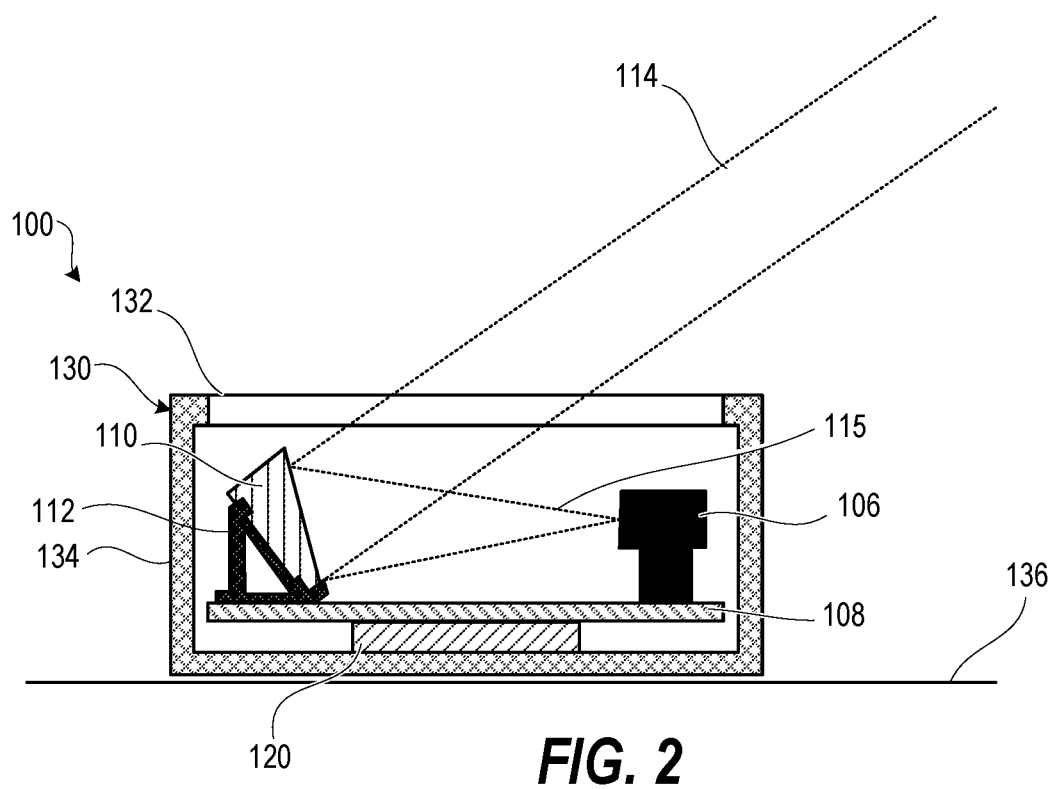
FIG. 2 is a side view the compact star tracker of FIG. 1 having a detector that is mounted on one edge of a round platform and oriented horizontally and diametrically across the round platform from an off-axis parabolic (OAP) mirror, according to one or more views.

FIG. 1 depicts a compact star tracker 100 having an instantaneous vectored field of regard (FOR) 101 swept out by rotating a fixed hemispheric field of view (FOV) 103 to detect an annular FOR 105. FIG. 2 depicts the compact star tracker 100 as including a detector 106 that is mounted on one edge of a round platform 108 and oriented horizontally and diametrically across the round platform 108 toward an off-axis parabolic (OAP) mirror 110 having a mirror face 111. A mounting bracket 112 is attached to another edge of the round platform 108 opposite to the detector 106 to hold the OAP mirror 110 at an OAP angle that reflects and focuses an incoming collimated beam 114 as a redirected beam 115 onto the detector 106. A rotation stage 120 supports the round platform 108 and can selectively rotate the round platform 108 about a center vertical rotation axis for a full 360°. In one or more embodiments, mounting bracket 112 is fixed in azimuth. In one or more embodiments, an adjustment mechanism are provided to tip the mounting bracket 112 and the detector 106 in unison to achieve a different elevation of the collimated beam 114. In one or more embodiments, an adjustment mechanism is provided to tilt the rotation axis of the round platform 108 to sweep a tilted annular FOR 105.

According to aspects of the present disclosure, the compact star tracker 100 is a celestial tracking device for celestial body sightings. The OAP mirror 110 is used to simultaneously accomplish the functions of: (1) collecting/focusing light (redirected beam 115) onto the detector 100; (2) pointing to a region at a fixed inclination relative to the compact star tracker 100. By limiting the hemispheric FOV 103 to an annular section (annular FOR 105) of the hemispherical FOV 103, the number of celestial bodies available for tracking purposes is reduced relative to the full hemisphere. The limited FOR can be optimized by careful selection of the OAP parameters (e.g., focal length and OAP angle), baffling and detector size. The detector 106 is selected for a range of wavelengths of interest, such as infrared, visual, ultraviolet, etc. The compact star tracker 100 can become quite compact and light as a result, using a rotation stage 120 that is low profile to actively steer the vectored FOR 101 around the region of interest. In one or more embodiments, an enclosure 130 of the compact star tracker 100 includes a transparent top window 132 that seals a base container 134. The enclosure 130 can be placed on, or mounted to, a substrate 136.

In addition to a very compact form factor, the OAP-based compact star tracker 100 has the advantage of NOT requiring any refractive elements to focus the light. This simplifies thermal compensation problems and avoids chromatic aberrations present in classical systems. The OAP mirror 110 provides perfect, geometrical point focus for when a collimated source (beam 114) is imaged as would be seen when imaging a star. The FOV 103 of the OAP mirror 110 is limited by other elements in the system such as field stops (the detector) or aperture stops (window or any baffling in the system) and is also influenced by the mirror focal length. The vectored FOR 101 should be limited based on the acceptable blur spot on the detector for the edges of the field.

Figure 3:
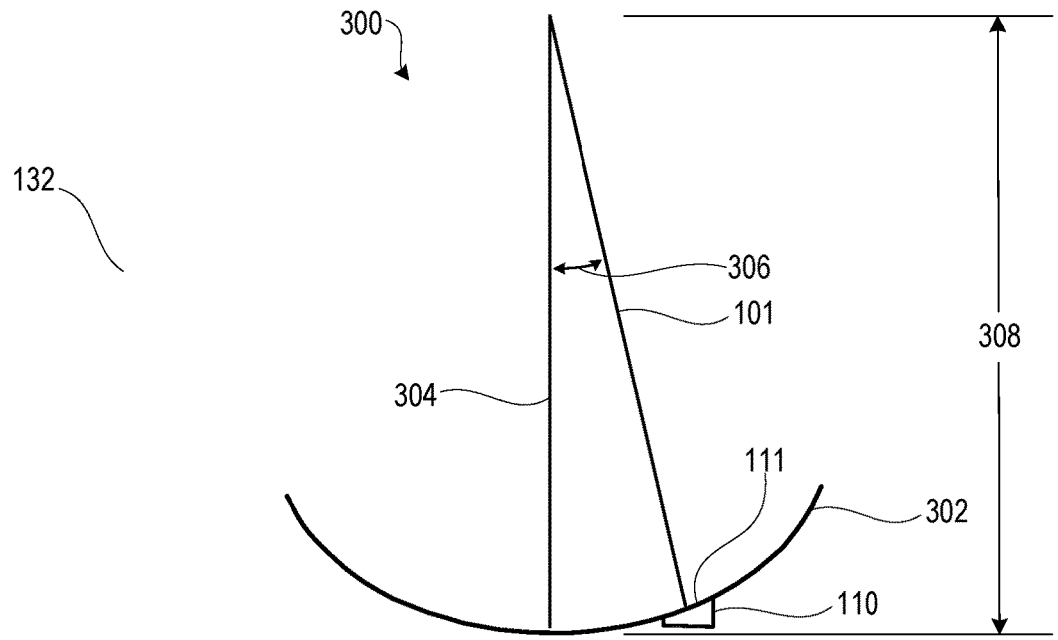
FIG. 3 is an optical diagram of a mirror face of the OAP mirror of FIG. 2 being a small segment that is off a central axis of a parent parabola, according to one or more embodiments.

FIG. 3 depicts an optical diagram 300 of the mirror face 111 of the OAP mirror 110 being a small segment of parent parabola 302. The OAP mirror 110 is positioned on the parent parabola 302 off a central axis 304 by an OAP angle 306. The parent parabola 302 and thus the OAP mirror 110 share a parent focal length 308. The inclination angle of sighted stars is determined by the OAP angle 306. Selection of the OAP design and the related inclination angle of the star tracker sighting region should be based on the intended application. The selection of OAP, baffling and detector determines the vectored FOR 101 of the compact star tracker 100, and ultimately the hemispheric FOV 103. The vectored FOR 101 of the OAP mirror 110 is affected by the OAP focal length as wells as the OAP angle 306. With a priori knowledge of the star tracker application, the vectored FOR 101 and elevation angle can be selected to optimize the star availability.

Figure 4:
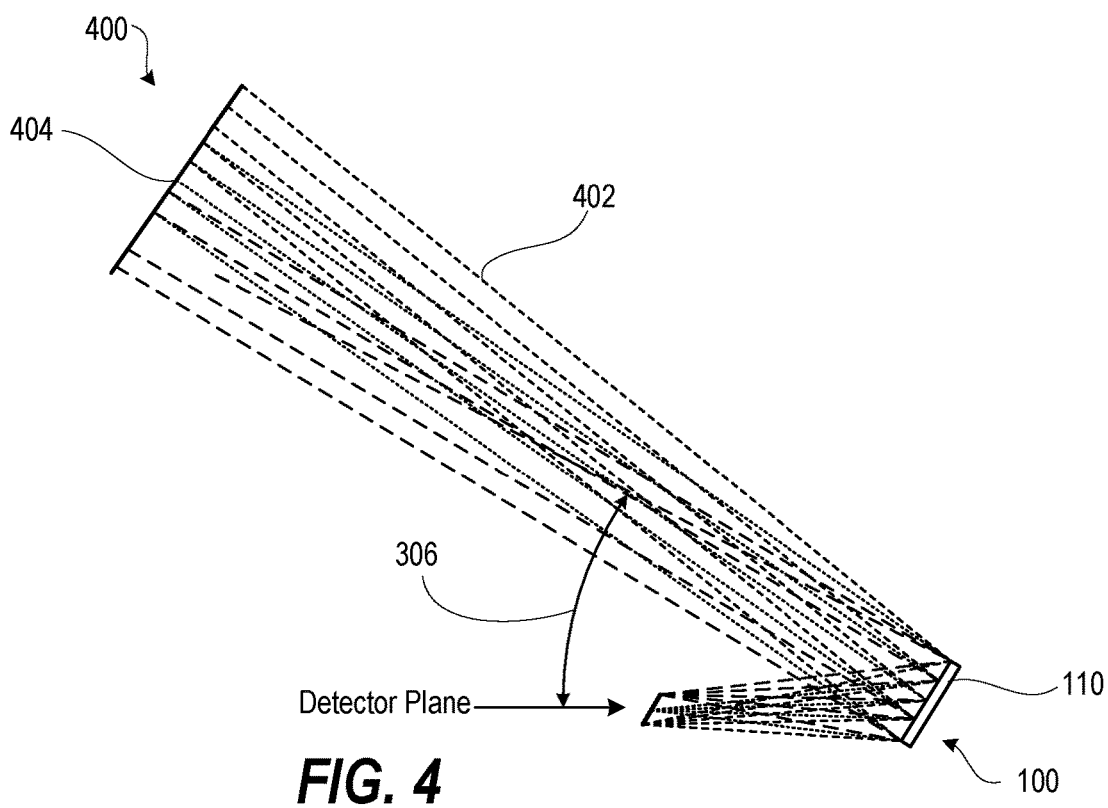
FIG. 4 is an optical diagram of the compact star tracker of FIG. 2 that is receiving non-collimated light from a non-infinite source, according to one or more embodiments.

FIG. 4 depicts an optical diagram 400 of the compact star tracker 100 receiving non-collimated light 402 from a non-infinite source 404. Though the OAP mirror 110 provides perfect point imaging for collimated input, for a finite FOV, the imaged regions becomes a tilted plane. The plane is tilted in one dimension only, corresponding to the vertical FOV extent. The lateral fields require no detector tilt. The detector can be chosen with responsivity in the spectrum of interest and parameters (pixel pitch and format, pixel binning, integration times and frame rates, etc.) appropriate for tracking software, sighting conditions and system level requirements.

The present innovation is distinct from other star tracker systems which: (a) Have all sensor hardware (baffle, detector, lens) installed on a gimbal to allow full FOR sighting; (b) Have Risley Prisms or steering mirrors to allow light from around the FOR to be directed to the sensor hardware; (c) Have a fixed lens and movable sensor, such as disclosed in U.S. Pat. No. 8,772,690 B2, the disclosure of which is hereby incorporated by reference in its entirety; and (d) Have a wide field lens, rotating base and movable baffle to select desired FOV from the FOR, such as disclosed in U.S. Pat. No. 9,544,488 B2, the disclosure of which is hereby incorporated by reference in its entirety.

All components of this invention can be made using standard techniques. OAP mirrors are commercially available, as are rotation stages and detectors. Mechanical mounting of items is per the system requirements as are stray light reduction systems such as baffles. Alignment processes follow conventional optical alignment processes.

The present innovation can consist solely of the hardware for celestial navigation systems, but would be used in conjunction with star catalogs and processing equipment in a manner similar to that discussed in McBryde, C., & Lightsey, E. G. (2012). A star tracker design for CubeSats. 2012 IEEE Aerospace Conference, 1-14, the disclosure of which is hereby incorporated by reference in its entirety.

One embodied variant of the above system utilizes multiple OAPs and one or more detectors on a single rotation platform, sharing a common window. The additional optical axes would allow for sampling additional portions of the sky, increasing the availability. Additional OAPs can be used to sense different magnitude stars, different inclination rings, different spectra, etc. One embodiment uses a broad spectrum camera with or without spectral filters that can be inserted in the optical axis to adjust sensitivity to different conditions (day, night, low altitude, high altitude, etc.). All embodiments may have associated power supplies and control electronics mounted to the rotating plate. Thermal compensation mechanisms may be included in any embodiment to allow focus compensation during large temperature changes.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

In the preceding detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A compact celestial tracker comprising:
   a platform;
   a rotation stage that is rotatably coupled to the platform to rotate a plane of the platform about a rotation axis and that supports the platform on a substrate;
   an off-axis parabolic mirror mounted to one side of the platform and having a focal plane directed at an acute angle that is between the rotation axis and the plane of the platform to reflect and focus the beam at a point above another side of the platform; and
   a detector coupled to the other side of the platform to receive and detect the reflected and focused beam, wherein
   the line of sight between a reflective face of the off-axis parabolic mirror and the detector is free of any object that would impede electromagnetic radiation in the visible spectrum.

* * * * *